United States Patent Office 3,144,127
Patented Aug. 11, 1964

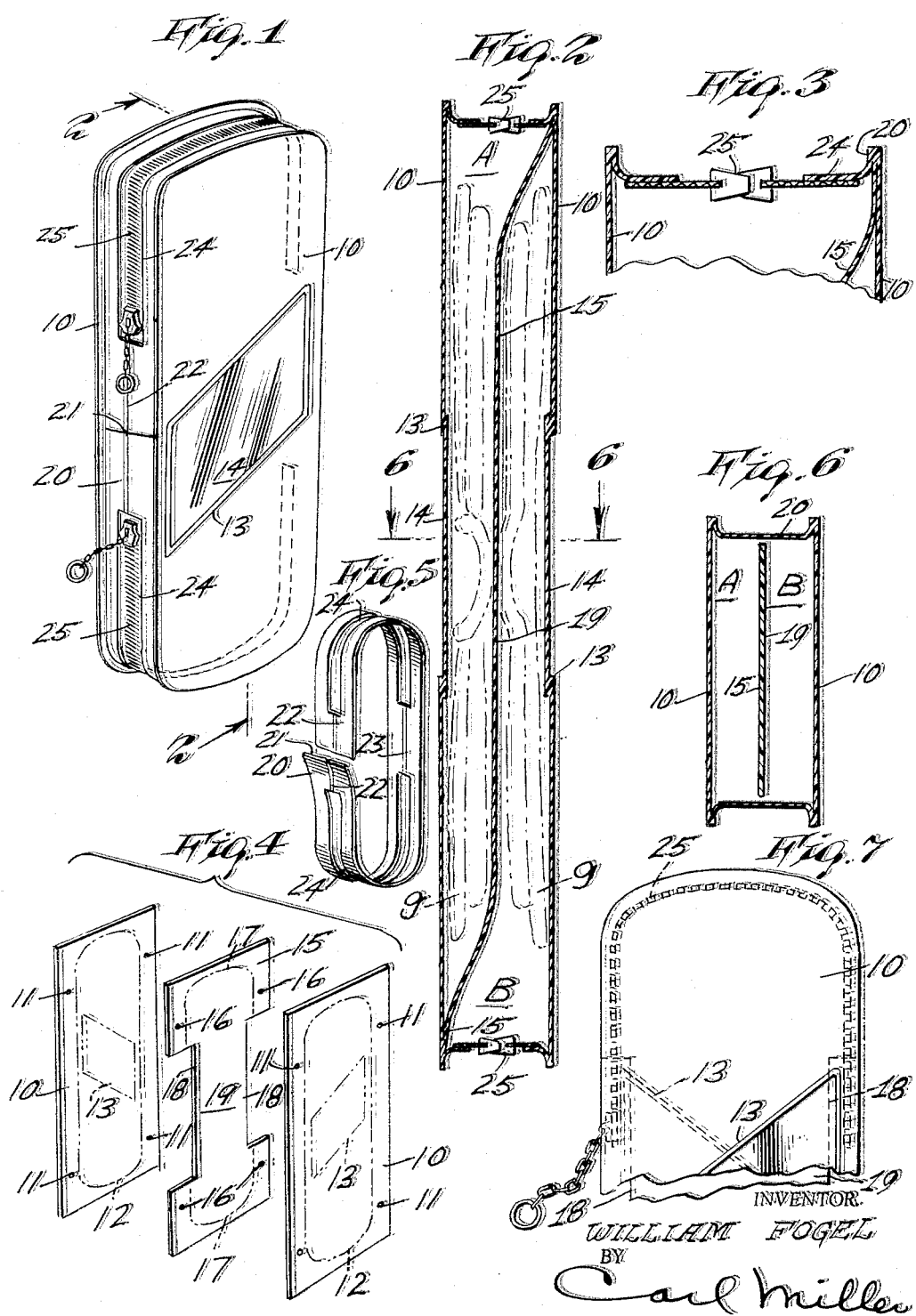

3,144,127
TWO-IN-ONE EYEGLASS CASE
William Fogel, 330 W. 28th St., New York, N.Y.
Filed Feb. 6, 1962, Ser. No. 171,401
3 Claims. (Cl. 206—5)

This invention relates to eyeglass cases and more particularly to such cases for holding two pairs of eyeglasses or any other articles as may be desired.

The general concept of an eyeglass case of this character is not new as shown by United States Patents 410,234, 1,649,255, and 2,905,312 granted to W. W. Brilhart, F. Robinson, and L. Gallin, respectively. However, an eyeglass case made in accordance with this invention obviates shortcomings found in the arrangements of the above, and in all other eyeglass cases for two pairs of eyeglasses previously constructed.

Accordingly, an object of this invention is to provide a case for preferably two pairs of eyeglasses which is light in weight, rugged in construction and inexpensive to manufacture.

Another object of this invention is to provide a case for two pairs of eyeglasses having no flap type closures, snaps, buttons or clasps or other extraneous and superfluous materials or matter to this eyeglass case.

Another object of this invention is to provide a case of the above character which is flexible.

Still another object of this invention is to provide a case for two pairs of eyeglasses which has closure means which prevents entrance of dust when the case is closed.

Another object of this invention is to provide a case of the above character which has window means in the wall of each compartment and in the divider panel for detecting which pair of eyeglasses is disposed therein without opening the case.

A still further object of my invention is to provide an eyeglass case for two pairs of eyeglasses, whereby the inserted eyeglasses cannot fall out, and also offers maximum protection with the least amount of space or superfluous materials.

These and other objects and advantages will become apparent by reference to the following description taken together with the accompanying drawings wherein:

FIGURE 1 is a perspective view of an eyeglass case made in accordance with the invention, FIGURE 2 is an enlarged sectional view taken along line 2—2 of FIGURE 1, FIGURE 3 is an enlarged sectional view of one end of the case of FIGURE 2, FIGURE 4 is an exploded view of the panels of the case of FIGURE 1 prior to assembly, FIGURE 5 is a perspective view of the tubular gusset portion of the case of FIGURE 1 prior to assembly.

FIGURE 6 is a sectional view taken along line 6—6 of FIGURE 2,

FIGURE 7 is a fragmentary side view of the case of FIGURE 1

Referring now to the drawings, an eyeglass case made in accordance with the invention has four primary elements in addition to the closure members as shown in FIGURES 4 and 5 prior to assembly. This case is most and absolutely unique, new, different and radical in design and construction in that it is exactly the same on all sides and angles top and bottom, the left side or right side, it is exactly the same on both sides and ends. The case has two elongated side panels 10 each with four holes 11 disposed near the four corners and outward of the trim line 12. A divider panel 15 is basically the same as and is disposed between the panels 10. Panel 15 which may be transparent, has four holes 16 similar to and alined with holes 11, and two cutouts in its longer walls to provide a divider body 19 narrower than the ends when finished or cut along trim lines 17.

As shown in FIGURE 5, a gusset or tubular panel 20 is made of a flexible sheet material having its ends 21 joined to form a tube. Panel 20 has a pair of spaced elongated closure slots 24, fold scores 22 from the ends of the slots 24 to the member ends 21, and a fold score 23 between the adjacent ends of the slots 24, permitting the eyeglass case to fold flat.

Slots 24 form the openings for the case and are closed by slide fasteners 25 connected to member 20. These fasteners may close the slots 24 by movement in the same or in opposite directions. While there are many and varied fasteners of this type, the one used for illustration has interengaging outer side walls which are welded or bonded to member 20.

The side panels 10 are cut as at 13 to provide windows that are closed by transparent panels 14 which may be welded, bonded or cemented in place. The holes 11 and 16 are for alinement pins for assembly, but this represents only one alternative of manufacture. The divider panel 15 is bonded, welded or cemented at one end to one side panel 10 and to the other side panel 10 at its other opposite end. The tubular wall or gusset 20 is similarly connected to both panels 10, and divider panel 15, is joined only at the opposite ends. Thus, panel 15 is a diagonally dividing wall. The diagonal divider panel 15 divides the area enclosed by the two panels 10 and the tubular panel 20 into two compartments A and B. Panel 15 is connected diagonally across the inside of the case as is clearly shown in FIGURE 2, with its main portion 19, free to move toward either side of the panels 10 in view of the two cut-out portions 18 on opposite sides of said divider panel 15. Each of the closure means 25 and the associated slot 24 provides a closable entrance by means of a slide fastener for either of the compartments A or B each of which, may be viewed through the associated transparent panel 14.

The novel features and the operation of this device will be apparent from the foregoing description. While the device has been shown and the structure described in detail, it is obvious that this is not to be considered limited to the exact form disclosed, and that changes may be made therein within the scope of what is claimed, without departing from the spirit of the invention.

Having thus set forth and disclosed the nature of this invention, what is claimed is:

1. An eyeglass case comprising a pair of side panels, a divider panel disposed between the side panels connected at one end only to one of the side panels and at the other opposite end only to the other of the side panels, a flexible tubular gusset encircling the divider panel and being connected to the divider panel ends and to the pair of side panels, to provide an area in the case divided into two compartments by the divider panel, the tubular gusset having cut-outs at its ends, each end providing separate entrance for each one of the compartments at only the ends of the eyeglass case, and slide fastener means connected to the tubular gusset for opening and closing each of the compartment entrances and both of such entrances at the same time.

2. The eyeglass case according to claim 1 in which the tubular gusset has fold scores extending from adjacent ends of the cut-outs, permitting the eyeglass case to fold along the scores and the slide fastening means.

3. The eyeglass case according to claim 2 wherein each side panel has a window closed by a transparent panel and the divider panel being transparent to provide complete vision through the entire case from each of the sides thereof.

(References on following page)

References Cited in the file of this patent

UNITED STATES PATENTS

| | | |
|---|---|---|
| 1,649,255 | Robinson | Nov. 15, 1927 |
| 2,288,996 | Dubilier | July 7, 1942 |
| 2,334,410 | Hume | Nov. 16, 1943 |
| 2,470,367 | Palma | May 17, 1949 |
| 3,000,417 | Goldstein | Sept. 19, 1961 |

FOREIGN PATENTS

| | | |
|---|---|---|
| 3,240 | Great Britain | Oct. 19, 1913 |
| 299,550 | Switzerland | Aug. 16, 1951 |